(12) United States Patent
Ratliff, Jr.

(10) Patent No.: US 6,520,230 B1
(45) Date of Patent: Feb. 18, 2003

(54) TIRE WITH AN OPEN TREAD

(75) Inventor: Billy Joe Ratliff, Jr., Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 85 days.

(21) Appl. No.: 09/656,055

(22) Filed: Sep. 6, 2000

(51) Int. Cl.[7] .......................... B60C 11/11; B60C 11/13; B60C 107/00; B60C 115/00
(52) U.S. Cl. .............................. 152/209.15; 152/209.22; 152/209.28
(58) Field of Search ....................... 152/209.15, 209.22, 152/209.28; 156/110.1

(56) References Cited

U.S. PATENT DOCUMENTS

| | | | |
|---|---|---|---|
| 4,690,189 A | * | 9/1987 | Bradisse et al. |
| 5,355,922 A | * | 10/1994 | Kogure et al. |
| 5,361,816 A | * | 11/1994 | Hitzky |
| 5,609,699 A | * | 3/1997 | Himuro |
| 5,714,021 A | * | 2/1998 | Ochi |
| 6,123,129 A | * | 9/2000 | Himuro |
| 2001/0017177 A1 | * | 8/2001 | Himuro |

FOREIGN PATENT DOCUMENTS

| | | | |
|---|---|---|---|
| EP | 655 353 | * | 5/1995 |
| EP | 849101 | * | 6/1998 |
| GB | 1549347 | * | 8/1979 |
| JP | 2-141310 | * | 5/1990 |
| JP | 5-319025 | * | 12/1993 |
| JP | 9-39515 | * | 2/1997 |
| JP | 11-91316 | * | 4/1999 |
| JP | 11-180114 | * | 7/1999 |

* cited by examiner

Primary Examiner—Steven D. Maki
(74) Attorney, Agent, or Firm—Nancy T. Krawczyk; David E. Wheeler

(57) ABSTRACT

A pneumatic tire that is designed primarily for use on paved surfaces, but may have application off-road, has extended chamfers aligned in a portion of the tire. In the illustrated embodiment, the chamfers are on leading and trailing portions of the lugs, are aligned axially in the tread, and together with acutely angled grooves in the tread, create an open, teeth like appearance in the tread.

12 Claims, 3 Drawing Sheets

TIRE WITH AN OPEN TREAD

FIELD OF THE INVENTION

The invention relates to a pneumatic tire, and a tread therefor, which has primary use on paved surfaces, but has additional application in off-the-road uses.

BACKGROUND OF THE INVENTION

In the tire art, it is often the case that different tires and different treads are made for different uses and applications. For example, a low net-to-gross tread pattern has advantages for a tire that is designed to prevent hydroplaning, and high net-to-gross tread patterns have application in tires designed for high traction on smooth surfaces. Likewise, open tread patterns are deemed useful for off the road applications, but often are considered to be too noisy for on-road applications.

It is a continuing goal in the art to provide tires and tread patterns which have desirable aspects for a broad range of applications, and it is a goal in the art to develop methods to design such tires.

It is an object of the present invention to provide a method of designing a tire which has broad range applications, and to provide a tire made by the method.

Other objects of the invention will be apparent from the following description and claims.

SUMMARY OF THE INVENTION

Figure 1:
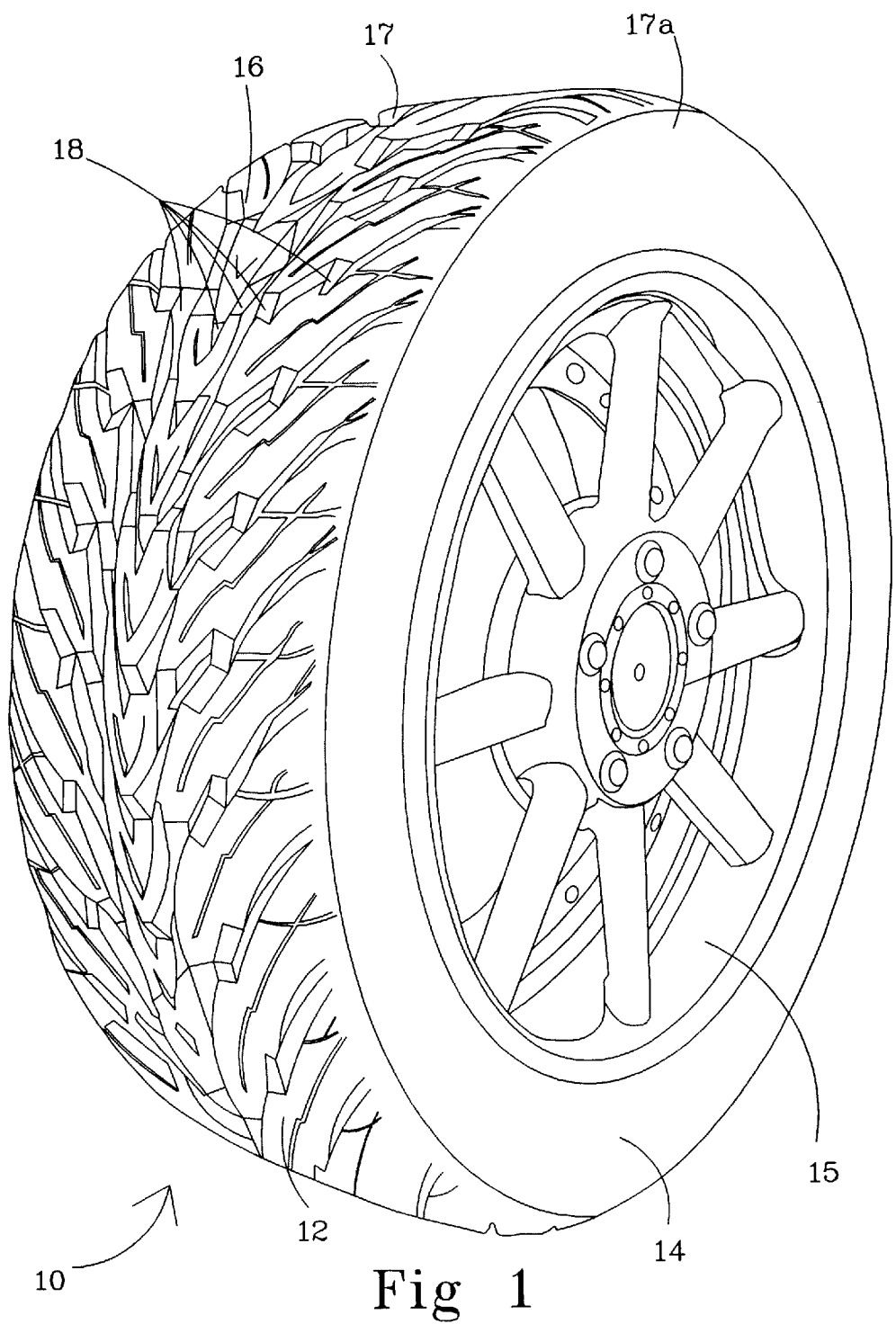
FIG. 1 illustrates a perspective view of a tire of the invention.

The invention relates to a tread for a pneumatic tire. The tread (12) has tread blocks (16), wherein aligned extended chamfers (18,22) have an angle of 30°–65° with respect to a plane that defines a non-skid depth of the tread, the aligned extended chamfers traversing at least a portion of the axial extent 'a' of the tread and being periodically disposed in the length direction 'l' of the tread. The blocks (16) may have chamfers (18,22) adjacent to one another.

In an illustrated embodiment, axially adjacent aligned chamfers are angled in opposed directions, and alternate chamfers are disposed in the same direction.

In the illustrated embodiment, cut lines (24), defined as the junction of a chamfer and a land area (16a) of a block (16), are axially aligned in the majority of chamfers (18,22) in each periodic disposition (20) of the chamfers, and at least one block (16) has two contiguous chamfers (22a,22b) which are angled in opposed directions. The chamfers (18,22) are substantially axially aligned.

In the illustrated embodiment, the blocks (16) are aligned on an angle φ with respect to the centerline (CL) of the tread. The grooves (28,30) forming the tread blocks are straight or arcuate, and are at an angle φ of substantially 10° to 90° with respect to the centerline (CL) of the tread.

In the illustrated embodiment, the tread (12) is directional and the grooves (28) have opposed angles φ of 10° to 70° with respect to the centerline (CL) and converge around the centerline (CL), whereby the blocks (16) terminate in points having acute angles, and the chamfers (18) are located on the acute angled points of the blocks. Center blocks (38), formed where angled grooves converge, have a narrow angled leading point (32) at a leading end and two narrow angled trailing points (32) at a trailing end, and all the points (32) are chamfered, wherein the leading points are chamfered at opposed angles as compared to the angles of the chamfers on the trailing points. Blocks (44) symmetrically encompass a periodically disposed alignment (20) of chamfers having contiguous opposed chamfers (22a,22b) disposed therein. Contiguous chamfers (22) have a cut line (26) defined by the conjunction of opposed chamfers (22a,22b), the cut line (26) being at an angle of substantially 90° with respect to a lateral groove wall (34) of the block. Extended chamfers (18,22) converge, which together with converging grooves (28) cause substantial open areas (36) in a tread pattern encompassing the blocks (16) and grooves (28).

Also provided is a method for designing a tire tread having biting surfaces for traction and smooth surfaces for a smooth ride on smooth surfaces comprising the steps of (a) providing extended chamfers in the tread in an aligned pattern in an axial portion of the tread, and (b) providing a substantially continuous circumferential locus of points in an axial portion of the tread contiguous with the extended chamfers.

DETAILED DESCRIPTION OF THE INVENTION

With reference now to FIG. 1, a tire 10 of the invention is illustrated mounted on a rim 15. The tire 10 comprises a tread 12 and sidewalls 14. As is known to those skilled in the art, a pneumatic tire is usually constructed with carcass plies wrapped around at least a pair of parallel annular beads, and usually has belt or breaker reinforcement in the crown area of the carcass directly under, i.e. radially inward of the tread. Grooves 28 and 30 in the tread (see FIG. 4) may divide the tread into blocks 16.

In the illustrated embodiment, most of the grooves in the tread design, i.e. grooves 28, are at acute angles to the centerline (CL) of the tread and divide the tread 12 into blocks 16 that are sharply angled into the center of the tire. Grooves 30, primarily in the shoulder area of the tire, are closer to 90° with respect to the centerline (CL), and more specifically have an angle of 75° to 90° with respect to the centerline (CL). The crossing of the acutely angled grooves 28 with the high angled grooves 30 in the shoulder 17 of the tire provides a crossing pattern which is believed to provide good cornering properties for the tire, since the crossing pattern of grooves 28,30 provides flexible, biting edges in an otherwise stiff and smooth shoulder construction. Extended chamfers 18 and contiguous chamfers 22 provide an open-tread pattern in the central regions of the tread, i.e. between shoulders 17 and 17a, said open tread pattern extending 50% to 80% of the axial width 'a' of the tread.

Figure 2:
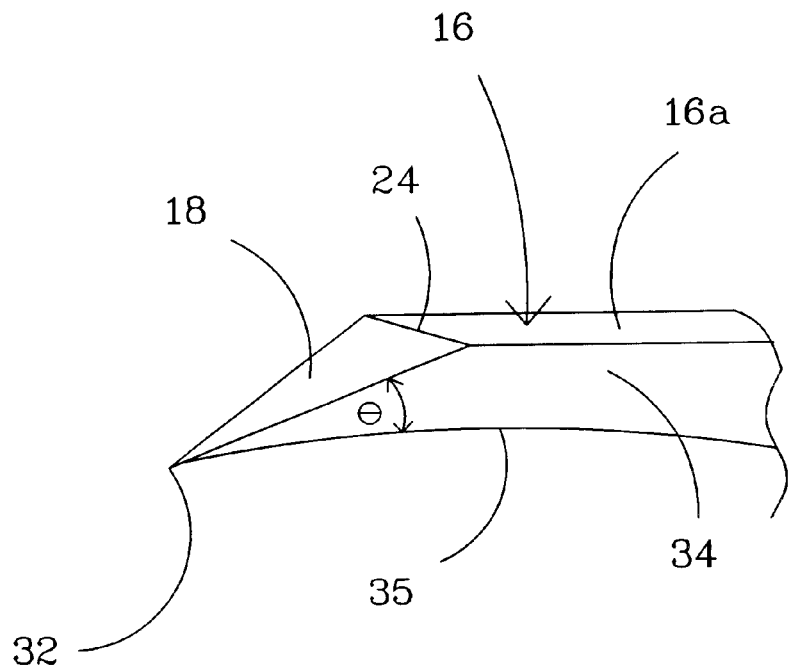
FIG. 2 illustrates a detailed view of a chamfered block used in a tire of the invention.
Figure 4:
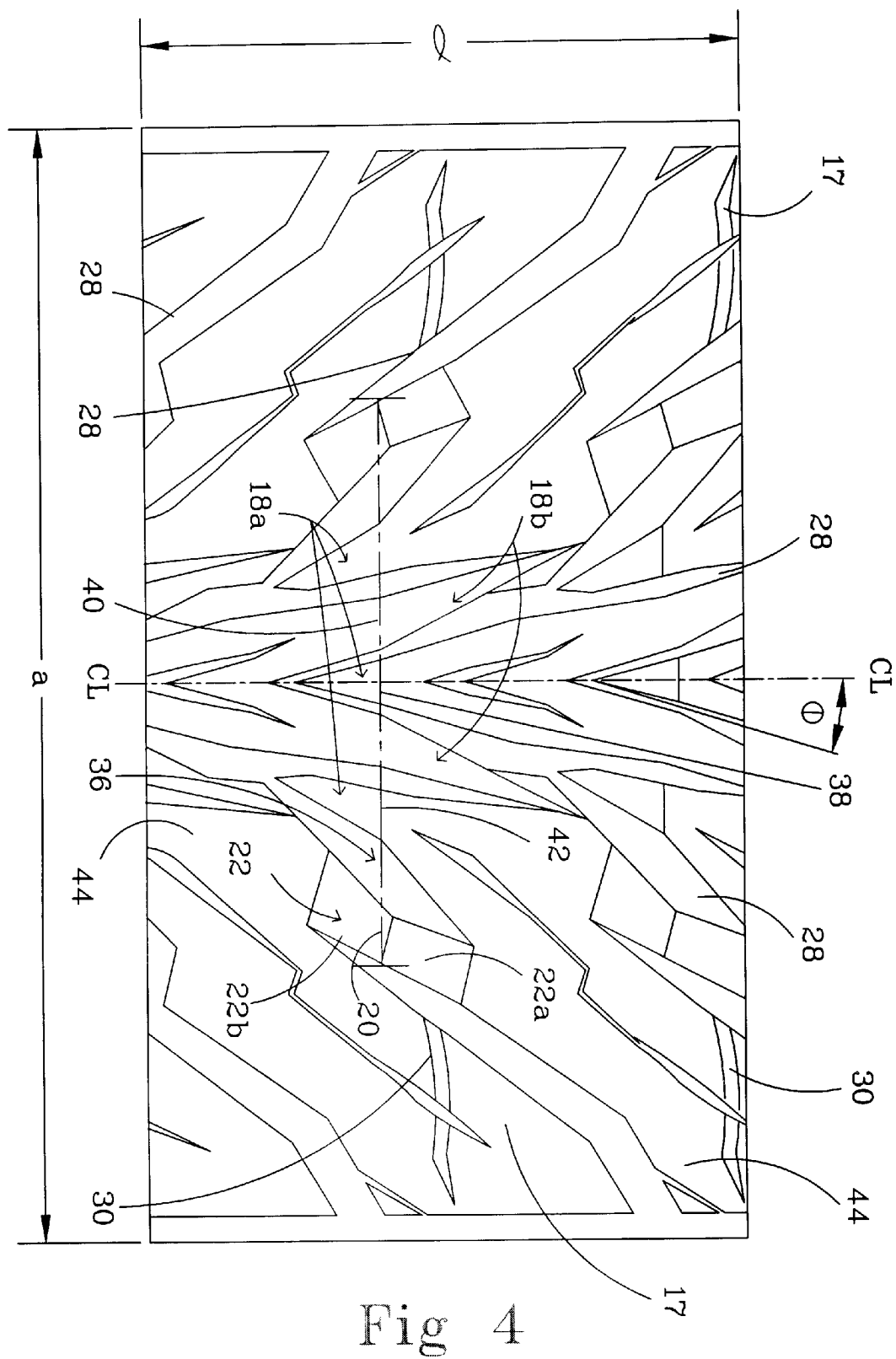
FIG. 4 illustrates a detailed view of an illustrated tread of the invention.

With reference now to FIGS. 2 and 4, extended chamfers may be provided at the end of a block 16, as is illustrated in FIG. 2, to provide an acutely angled chamfer 18 which narrows down to a point 32 at the non-skid 35 of the tread.

As illustrated in the drawings, the extended chamfers 18 are placed on the leading and trailing edges of blocks 16. Extended chamfers 18 meet the land area 16a of blocks 16 at cut lines 24. Cut lines 24 of extended chamfers 18a, which are on a leading end of a block 16, and cut lines 24 of extended chamfers 18b, which are on a trailing end of a block 16, are in axial alignment in the tread. That is, the extended chamfers 18a, 18b are arranged in zones in the tire tread where they create an aligned pattern 20.

In the illustrated embodiment, the chamfers 18 are aligned axially, but those skilled in the art will recognize that the chamfers may be aligned circumferentially around the tread when it is disposed on a tire, or at some angle between circumferential and axial alignment, i.e. a staggered alignment where different zones are aligned axially, and the different zones are off-set from each other. Aligned patterns 20 are disposed periodically over the length 'l' of the tread.

Since the cut lines 24 of the extended chamfers 18 are in axial alignment 20, and taper down to non-skid 35 of the tread, the angle θ of the extended chamfers 18 with the non-skid 35 depends on the length of the chamfers 18. The length of the chamfers 18 depends in part on the position chosen for alignment 20 of the chamfers in the tread, and in part on the angles φ of the grooves 28 with the centerline (CL), since the angles φ of the grooves 28 at a particular location in the tread determine the geometry and length of chamfers 18.

Figure 3:
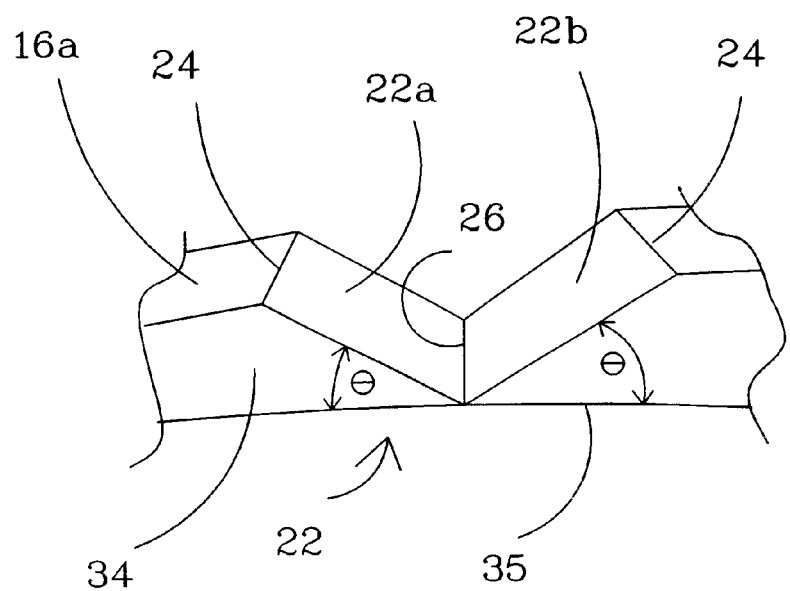
FIG. 3 illustrates an alternative embodiment of a chamfered block used in a tire of the invention.

As illustrated in FIG. 3, contiguous chamfers 22, defined by the conjunction of opposed chamfers 22a, 22b, may be provided in a groove between blocks. In the illustrated embodiment, chamfers 22a, 22b have surfaces each of which are substantially rectangular in shape. Chamfers 22a, 22b of the contiguous chamfer 22 extend down to the non-skid 35 of the tread where the faces meet in cut line 26.

In the illustrated embodiment, grooves 28 may have an angle φ of 15 to 60 degrees with respect to the centerline (CL) of the tread. Extended chamfers 18 and contiguous chamfers 22 may have an angle of 30 to 65 degrees with respect to plane 35 which defines a non-skid depth of the tread.

With reference in particular to FIG. 4, in the illustrated embodiment, extended chamfer 18a on center block 38 has a cutline 24 which is in alignment with the cutline 24 of extended chamfers 18b on the tailing edge of adjacent center block 40 (in the illustrated embodiment, there are two such trailing edges), which are in turn aligned with cutlines 24 of extended chamfers 18a on shoulder blocks 42. The alignment of cutlines 24 on the extended chamfers 18a and 18b is illustrated by line 20. Also, in the illustrated embodiment, contiguous chamfers 22 in the next adjacent shoulder block 44 are provided in the middle of the groove 28, so that the void area created by the contiguous chamfers 22 can be aligned with the void areas created by chamfers 18a and 18b.

Contiguous chamfer 22a provides a lead into the footprint of the tire when a tire on which the tread is disposed is rotating, and contiguous chamfer 22b leaves the footprint last, i.e. is on the trailing edge of the footprint when a tire on which the tread is disposed is rotating.

In the illustrated embodiment, cutline 26, which is formed at the junction of extended chamfer 22a and extended chamfer 22b, at the nonskid depth of the tread, is at an angle of substantially 90° with respect to the groove wall 34 of block 44.

Open areas 36, caused by the presence of extended chamfers 18 and contiguous chamfers 22 in combination with the grooves (28), provide a more aggressive look for the tire tread, and since the pattern is repeated periodically over the length 'l' of the tread, provide a biting or teeth-like appearance to the tread.

The overall tread pattern has a low net to gross, which suggests that a tire made using such a tread will demonstrate good hydroplaning properties, but the extended chamfers act substantially like buttresses to blocks 16, which helps maintain the stiffness of the tread, to provide good traction and handling properties.

In the method of the invention, a tire tread is designed wherein extended chamfers are placed in the tread in a particular pattern, i.e. the extended chamfers are aligned, which provides an aggressive look in an axial portion of the tread. In the same axial portion of the tread, the tread pattern is provided with a substantially continuous circumferential locus of points. The extended chamfers provide an open, aggressive tread portion contiguous with a circumferentially smooth tread portion, wherein the open aggressive portion provides biting edges for traction, and areas to capture water to help prevent hydroplaning, and the smooth tread portion provides for a smooth ride on smooth surfaces.

While the invention has been specifically illustrated and described, those skilled in the art will recognize that the invention may be modified and practiced without departing from the spirit of the invention. The invention is limited only by the following claims.

What is claimed is:

1. A tread for a pneumatic tire, said tread having rows of tread blocks formed by at least one groove, the tread blocks comprising chamfers wherein each of the chamfers have a sharply defined cut line at the tread block and extend to a plane defining the non-side depth of the tread, each of the chamfers having an inclined surface, the inclined surface being inclined at an angle of 30°–65° with respect to the plane, and wherein the cut lines of at least three chamfers in different rows of tread blocks are aligned along a portion of an extent (a) of the tread such that the cut lines of the at least three chamfers are colinear and define an aligned pattern; the aligned pattern is periodically disposed in a length direction (l) of the tread and axially adjacent inclined surfaces of the aligned cut lines are angled in opposing directions relative to the length direction of the tread.

2. The tread of claim 1 wherein cut lines defined by the meeting point of an end of the inclined surface of the chamfer and the edge of a tread block are axially aligned in the majority of chamfers in each periodic disposition of said chamfers.

3. The tread of claim 1 wherein the at least one groove forming said tread blocks is straight or arcuate and is at an angle φ of substantially 10° to 90° with respect to the centerline (CL) of said tread.

4. The tread of claim 1 wherein said tread is directional and has at least one groove on each side of the centerline (CL), said grooves on each side of the centerline (CL) have opposed angles φ of 10° to 70° with respect to said centerline (CL) and converge around said centerline (CL), whereby said tread blocks terminate in points having acute angles and said chamfers are located on the acute angled points of said tread blocks.

5. The tread of claim 4 wherein center blocks are formed where angled grooves converge, the center blocks having a narrow angled leading point at a leading end and two narrow angled trailing points at a trailing end, and all said points are chamfered wherein the inclined surfaces on the chamfered leading points are inclined in a direction relative to the length direction (l) of the tread opposite from the inclination direction of the inclined surface of the chamfered trailing points.

6. The tread of claim 4 wherein the chamfers, together with the converging grooves cause substantial open areas in a tread pattern encompassing said tread blocks and grooves.

7. The tread of claim 1 wherein alternate inclined surfaces of the aligned cut lines are disposed in the same direction relative to the length direction (l) of the tread.

8. The tread of claim 1 wherein at least two tread blocks adjacent to one another in the length direction of the tread each have a chamfer, the inclined surfaces of the chamfers bring angled in opposing directions relative to the length direction of the tread and contacting each other at the non-skid depth of the tread.

9. The tread of claim 8 wherein tread blocks symmetrically arranged on each side of the aligned pattern have said opposed connecting chamfers.

10. The tread of claim 8 wherein a cut line is defined by the conjunction of the opposed chamfers, said cut line being at an angle of substantially 90° with respect to a lateral groove wall of said tread blocks.

11. The tread of claim 1 wherein the alignment of the cut edges of the chamfers is characterized as a line extending substantially axially a cross the axial extent (a) of the tread.

12. A tread for a pneumatic tire, said tread having blocks formed by at least one grove, the tread comprising at least two tread blocks adjacent to one another in the length direction (l) of the tread each having a chamfer, each of the chamfers have a sharply defined cut line at the tread block and extend to a plane defining the non-skid depth of the tread, each of the chamfers having an inclined surface, the inclined surface being inclined at an angle of 30°–65° with respect to the plane and wherein the inclined surfaces of the chamfers in the adjacent tread blocks are angled in opposing directions relative to the length direction of the tread and contact each other at a contacting line at the non-skid depth of the tread, and each tread block further comprising a second chamfer with a cut line axially aligned with the contacting line of the opposing contacting chamfers.

* * * * *